United States Patent Office 2,962,421
Patented Nov. 29, 1960

2,962,421

PROCESS FOR REMOVING SULFUR DIOXIDE FROM AQUEOUS LIQUORS

Dale W. Johnson, Chicago, and Percy L. Julian, Oak Park, Ill., assignors to The Glidden Company, Cleveland, Ohio, a corporation of Ohio No Drawing. Filed Oct. 28, 1952, Ser. No. 317,372

20 Claims. (Cl. 195—39)

This invention relates to an improved process for expelling or otherwise removing sulfur dioxide from various aqueous liquors containing same.

Sulfur dioxide occurs in various aqueous liquors either adventitiously or by intent in small quantities, and for various reasons the reduction or complete elimination of the sulfur dioxide content of such liquors may be desired. For instance, sulfur dioxide is sometimes intentionally introduced into wines in the course of its preparation, but before the wine can ultimately be sold, its sulfur dioxide content must be reduced or eliminated in compliance with prevailing food regulations. The waste sulfite liquors of the pulp industry provide another example since various waste sulfite liquors are valuable as nutrient media for industrial and other microbial processes after their relatively high sulfur dioxide contents have either been reduced or eliminated. The whey produced as a waste product in the isolation of soya and other vegetable proteins is another type of aqueous liquor which may carry sulfur dioxide contents harmful to the use of such liquors for fermentation and other industrial purposes.

Various methods are known for treating the above and other liquors to expel sulfur dioxide therefrom, but to the best of our knowledge, such methods have either been based on chemical reactions which involve substantially stoichiometric quantities of reagents, or have been based on purely physical entrainment treatments. We have now discovered, however, that sulfur dioxide can be effectively removed from liquors of the kinds mentioned above by aerating them in the presence of a dispersion of a particular class of catalysts identified hereinafter.

Accordingly, it is an object of our invention to provide a process in which aqueous liquors containing small amounts of sulfur dioxide are aerated in the presence of dispersed catalyst, thereby to remove sulfur dioxide from the liquors.

It is a further object to provide a process in which aqueous liquors generally containing less than about 1% of sulfur dioxide are aerated in the presence of less than the stoichiometric quantity of one or more oxidic compounds of manganese, thereby to effect the removal of sulfur dioxide from the liquors.

These and other objects will be apparent from the following description of our invention.

We have discovered that finely-divided manganese dioxide and various other oxidic manganese compounds identified hereinafter, when maintained dispersed in an aerated aqueous liquor containing small amounts of sulfur dioxide, are effective catalysts for inducing or otherwise causing sulfur dioxide to be expelled or otherwise removed from the liquor. We have found that the following factors influence the rate of elimination of sulfur dioxide: (a) rate of aeration, (b) pH, (c) temperature, (d) time, (e) character of liquor being treated, and (f) specific nature and amount of catalyst. These factors will be discussed below so as to enable one skilled in the art better to appreciate their influence.

RATE OF AERATION

We have found that the solution being treated should in all cases be stirred or otherwise agitated sufficiently to keep the major amount of the catalyst in suspension. The observed effects of the oxidic manganese catalyst are believed to be at least partly topochemical in nature, so that it is desirable to present as much catalyst surface as possible for contact with the liquor. This can be accomplished by using finely-divided catalyst, e.g. 200 mesh and finer, and by maintaining the catalyst in suspension by efficient agitation. The agitation may be accomplished in any of the known manners, as by stirring vigorously or by blowing gases through the liquor. The introduction of oxygen is also a necessary part of the treatment, so that if mechanical stirring alone is employed, it should be vigorous enough to pull air into the solution. Preferably, however, the suspension of the catalyst is accomplished at least in part by blowing an oxygen-containing gas such as air through the liquor in volumes at least adequate to maintain the catalyst well dispersed, and at the same time mechanically stirring the liquor. We have found that aeration at a rate of about ½ volume of air per unit volume of solution being treated gives useful rates of reduction of sulfur dioxide when other factors are favorable. Under less favorable conditions, or where the liquors contain materials which tend to bind the sulfur dioxide more firmly, aeration rates of one or even two volumes of air per minute per unit volume of solution can be used advantageously to secure useful rates of reduction of sulfur dioxide. Even greater rates of aeration can be used, but are seldom necessary.

pH OF SOLUTION

We have found that the oxidic manganese catalysts are rather ineffective in basic solutions as shown by Example IX and are of greatest effectiveness in moderately acid solutions. Accordingly, the pH of the solution being treated should be below 7, and in treating liquors carrying dispersed acid-precipitable protein, the acidity can advantageously be above or below the isoelectric point or range of the protein rather than at the isoelectric point or range. As will be seen in Example IV below, the rate of elimination of sulfur dioxide is greater at a pH of 2 than at the isoelectric range of 3 to 4 for the protein of the liquor there being treated.

It should be understood that where we have referred hereinabove to pH, we mean the initial pH of the liquor. As aeration and catalytic treatment proceed, sulfur dioxide is oxidized in part to sulfur trioxide which gradually lowers the pH of the solution.

TEMPERATURE OF SOLUTION

We have found that any temperature up to the boiling point of the solution can be used, with higher temperatures usually giving more rapid rates of elimination of sulfur dioxide than lower temperatures. However, temperature as a factor is not independent of the other factors discussed above and below, and it is quite possible to have as rapid elimination of sulfur dioxide at room temperature under a favorable combination of other factors as at higher temperatures with a less favorable combination of other factors. Everything else being equal, however, higher temperatures favor a more rapid rate tending toward complete elimination of sulfur dioxide; as a matter of preference, the boiling point of the mixture is to be desired as a practical maximum (or optimum) operating temperature.

TIME AS FACTOR

The duration of the treatment is a factor only to the extent that it may require one to seek a more favorable combination of factors if the optimum elimination of sulfur dioxide is to be completed within a predetermined period of time. That is, treating conditions in one plant may give the desired elimination of sulfur dioxide within a time period which is satisfactory for the working cycle of that plant, whereas those same conditions might be unsatisfactory in some other plant which by reason of its cycle of operations must effect the same total elimination in a shorter period of time. It is within the ability of one skilled in the art to make such adjustments in the treating conditions as will best suit his particular needs or operations.

CHARACTER OF LIQUOR

Sulfur dioxide seems to be held more firmly by some solutions than by others, this being due in all probability to the presence or absence of components in the solution with which the sulfur dioxide forms loose chemical and/or physical combinations. We have mentioned above that protein is one such component. Lignin of sulfite liquors, as well as various other chemical entities in sulfite liquors, also appear to influence the ease and completeness of the sulfur dioxide removal. In practicing our invention, one skilled in the art must take the character of the liquor into consideration; if the liquor is at all amenable to treatment so as to lose sulfur dioxide on simple aeration, then the presence of dispersed oxidic manganese catalyst therein will not only accelerate the rate of elimination of sulfur dioxide therefrom, but will also tend to favor the complete elimination of sulfur dioxide therefrom.

The invention can be practiced advantageously in connection with liquors having 2% or more of sulfur dioxide, but is especially useful in connection with liquors of lower concentration, e.g., solutions containing 6000 parts per million or less (0.6%). Sulfite waste liquors usually contain about 5000 to 6000 p.p.m. of sulfur dioxide while wheys from the extraction of vegetable protein usually contain less than 3000 parts per million.

SPECIFIC NATURE OF CATALYST

Without wishing to be bound by our theories concerning the action of the catalyst, our investigations lead us to believe that the catalyst functions in two if not in all of three ways: first, to react with sulfur dioxide to cause the direct oxidation of the latter to sulfur trioxide and the concurrent formation of lower valent manganese salts; secondly, to catalytically free the sulfur dioxide from solution and from any loose chemical or physical combinations in which it occurs in the liquor, thereby to promote its removal in the form of sulfur dioxide on aeration; or thirdly, to catalyze the oxidation of sulfur dioxide to sulfur trioxide by the oxygen of the aerating gas. Inasmuch as some manganese catalyst is lost by conversion to soluble compounds, it seems evident that the catalyst functions at least in the first way mentioned above, as represented by the equation:

$$MnO_2 + 2SO_2 \rightarrow Mn^{++} + 2SO_3$$

However, we have ascertained by chemical analyses that this reaction does not account for all of the beneficial effect of the catalyst, since the equation would permit 1 part of $MnO_2$ to oxidize only 1.47 parts of $SO_2$ while we have actually found that 1 part of catalyst will oxidize or otherwise free close to three parts of $SO_2$. Moreover, we have found that the formation of sulfur trioxide does not account for all of the sulfur dioxide which has been removed from the liquor under treatment; part is expelled in the form of sulfur dioxide. Accordingly, it is apparent that while manganese dioxide and other oxidic manganese catalysts may function partially on a stoichiometric basis, the presence of the catalyst(s) also induces the liberation of sulfur dioxide in other ways. Our belief that such action is catalytic in nature is substantiated also by our further discovery that manganese dioxide and other oxidic compounds of manganese are the only highly effective compounds of the many metallic oxides which we have tried. Copper oxides, ferric oxide, nickel oxide, lead oxide, cobalt oxide, chromic oxide, aluminum oxide and titanium oxide have been found in our investigations to be wholly ineffective as replacements for our oxidic manganese catalysts. Zinc oxide is slightly effective, but permits the elimination of only about 30% as much $SO_2$ as manganese dioxide permits under the same treating conditions. Accordingly, it appears that oxidic manganese compounds are specific catalysts for the elimination of $SO_2$ by aeration. We have also found that a mixture of zinc oxide and manganese dioxide is practically no more effective than is zinc oxide alone; hence it appears that zinc oxide may poison the manganese dioxide catalyst.

The oxidic manganese catalysts of this invention are the oxides, hydroxides and carbonate of manganese in which the valency of manganese is two through four. The individual manganese compounds per se, if available, can be used alone or in admixtures, but the natural ores are equally suitable alone or in admixtures with chemical compounds. Thus, the catalyst(s) may be one or more of the following:

Manganous hydroxide ($Mn(OH)_2$) pyrochroite
Manganic hydroxide $\begin{Bmatrix} MnO \cdot (OH) \\ (Mn_2O_3 \cdot H_2O) \end{Bmatrix}$ manganite
Manganous oxide (MnO) manganosite
Manganese oxide (ous, ic) ($Mn_3O_4$) hausmannite
Manganese sesquioxide (ic) ($Mn_2O_3$)
Manganese dioxide (ic) ($MnO_2$) $\begin{Bmatrix} \text{pyrolusite} \\ \text{psilomelane} \end{Bmatrix}$
Manganous carbonate ($MnCO_3$) rhodochrosite Other less common ores which contain the above compounds and are essentially free of inhibitors can also be used, as can such synthetic products as blast furnace open-hearth slag, which is well known to contain appreciable quantities of oxidic manganese.

There has been considerable evidence in recent years that oxidic manganese compounds are less simple in their chemistry than the time-honored formulae suggest. See Comptes Rendus, 232, 339–47 (1951) (Chem. Abstracts 45:5502f) where Brenet and Briot indicate that even the formula $MnO_2$ cannot be applied to all of the O compounds supposed to have this composition. The complexity of the lower oxides and hydrated oxides has also been widely recognized for many years. Accordingly, we do not want to be bound to specific chemical formulae in the following claims, particularly since it is evident to us that the initial form of the catalytic material is in many instances of little significance, the dispersion of the initial material in the liquor to be treated, the acidity thereof and the accompanying aeration of our treatment generally giving rise to one or more conversion products in situ which are in all probability the active catalytic agents.

From the foregoing remarks we do not intend to imply that any selected oxidic manganese compound or ore can be substituted on a weight-for-weight basis for some other compound or ore which one may be using effectively. When such substitutions are contemplated, a few experimental tests may be needed to establish the most effective concentration of catalyst under the precise conditions of the intended use. Those skilled in the art will appreciate the merit of such preliminary tests, and will have no difficulty in reaching the optimum treating conditions for the situation confronting them. We have observed that amounts of catalyst having an oxidic manganese content above about 2% by weight on the liquor are seldom needed and that 1% of oxidic manganese content constitutes an amount which is generally satisfactory. In specific instances, however, as the examples indicate, amounts as low as 0.05% are effective. In the case of manganese dioxide, amounts between about 0.1% and 0.5% are preferred when the liquor being treated is a proteinaceous whey.

We have found that the catalyst which remains at the termination of a batch treatment of liquor can be filtered out readily and re-used in subsequent batches. As indicated, however, some of the catalyst is generally lost in the form of soluble salts, so the amount of catalyst recovered must generally be supplemented with new catalyst in treating each subsequent batch.

The invention will be understood more fully from the following examples.

EXAMPLE I

Fifteen liters of whey resulting from the isolation of soya protein and containing about 1600 parts per million of $SO_2$, about 1.3% solids, with a pH of about 4.6, was brought to a pH of 1.65 by the addition of sulfuric acid and was then aerated at the rate of one volume of air per minute per unit volume of initial whey in the presence of 1% of 200 mesh manganese dioxide. A sample of whey taken for analysis as soon as possible after the addition of the manganese dioxide showed that all of the sulfur dioxide had been removed substantially immediately.

An additional 15 liters of the whey was brought to a pH of 1.65 and treated exactly as above except that only 0.1% of the manganese dioxide was added, based on the liquid weight of the whey. It was found that all of the sulfur dioxide was removed by treating for 15 to 20 minutes. The catalyst was allowed to settle and the liquid was decanted off. The liquid was then brought to a pH of 7 and contaminated with a variety of bacteria and mold. Within 72 hours vigorous growth of microorganisms took place. The growths were primarily of the anaerobic type of fermentation producing butyric acid. After 8 to 10 days a heavy growth of mold was noted. Thus it became evident that the catalytic aeration of the whey had effectively eliminated the sulfur dioxide content of the original whey, and that the treated whey would support the growth of microorganisms. The untreated whey inoculated and incubated under identical conditions showed no growth in the same period of time.

The manganese dioxide which had been settled above was dried and ashed. Of the original 15 grams of catalyst added, 8.4 grams were recovered. Since the original whey contained 1600 p.p.m. $SO_2$, the 15 liters contained 24 grams of sulfur dioxide and should have required 16.3 grams of manganese dioxide if the reaction were according to the following equation:

$$MnO_2 + 2SO_2 \rightarrow Mn^{++} + 2SO_3$$

Actually, however, only 6.6 grams were consumed.

Aeration of a sample of the acidified whey at the same rate and under the same conditions as above, but in the absence of manganese dioxide, showed that several hours of aeration failed to remove any substantial amount of the sulfur dioxide.

In the following Examples II–IX, inclusive, the respective treatments were applied to samples of the original whey used in Example I, the variations in treatment being otherwise as indicated in the respective examples.

EXAMPLE II

Effect of rate of aeration

The whey was aerated at room temperature in the presence of 0.1% manganese dioxide and at a pH of 4.6 (the natural pH of the whey), using various aeration rates listed below:

| Aeration Rate in Volumes of Air Per Volume of Initial Whey | Time in Minutes to Remove all Sulfur Dioxide |
| --- | --- |
| 2 | 25. |
| 1 | 30. |
| ½ | 30. |
| 0 [1] | more than 60. |

[1] No aeration except that obtained due to stirring.

EXAMPLE III

Effect of catalyst concentration

The whey was aerated at a rate of one volume of air per unit volume of whey at room temperature and with the whey at an initial pH of 4.6. Samples of the treated material were taken for analysis at 5-minute intervals.

| Concentration of $MnO_2$ added to Whey | Concentration of $SO_2$ in whey before treatment, p.p.m. | Time Required to remove all $SO_2$ |
| --- | --- | --- |
| 1% | 1,590 | 15 minutes. |
| 0.5% | 1,580 | 10 minutes. |
| 0.1% | 1,510 | 20 minutes. |
| 0.05% | 1,430 | 60 minutes. |
| 0 | 1,570 | No removal in 60 min. |

EXAMPLE IV

Effect of pH using 0.1% catalyst

The whey was stirred mechanically and aerated at a rate of one volume of air per unit volume of whey, at room temperature and in the presence of 0.1% manganese dioxide. The pH was adjusted by adding sulfuric acid.

| pH at start of treatment | $SO_2$ concentration in whey before treatment, p.p.m. | Time required to remove all $SO_2$, minutes |
| --- | --- | --- |
| 4.6 | 1,510 | 20 |
| 4.0 | 1,640 | 20–35 [1] |
| 3.0 | 1,640 | 20–25 [2] |
| 2.0 | 1,640 | 15 |

[1] Results on triplicate runs.
[2] Results on duplicate runs.

EXAMPLE V

Effect of pH using 0.50% catalyst

The whey was treated as in Example IV except that 0.5% manganese dioxide was used.

| pH at start | $SO_2$ concentration at start, p.p.m. | Time required to remove all $SO_2$ |
| --- | --- | --- |
| 4.6 | 1,430 | 60 minutes. |
| 4.0 | 1,655 | 90 minutes. |
| 3.0 | 1,655 | More than 75 min. |
| 2.0 | 1,655 | 50 minutes. |

EXAMPLE VI

Effect of stirring rate at pH 4.6

The whey was stirred without positive aeration at room temperature in the presence of 0.1% $MnO_2$ and at a pH of 4.6.

| Stirring rate | $SO_2$ Concentration at start, p.p.m. | $SO_2$ Concentration (p.p.m.) after stirring | |
| --- | --- | --- | --- |
| | | 15 min. | 50 min. |
| Very slow, some settling of catalyst | 1,510 | 1,360 | 1,140 |
| Stirring to keep catalyst in suspension without pulling in an appreciable amount of air | 1,570 | 1,220 | 1,000 |
| Rapid stirring pulling in appreciable quantity of air | 1,570 | 680 | 8 |

EXAMPLE VIII

Effect of stirring rate at pH 2.15

Whey treated by stiring without positive aeration, at room temperature and at a pH of 2.15 in the presence of 0.1% $MnO_2$.

| Stirring Rate | $SO_2$ concentration in whey at start, p.p.m. | $SO_2$ concentration (p.p.m.) in whey after stirring | | |
|---|---|---|---|---|
| | | 10 min. | 20 min. | 50 min. |
| Slow stirring to keep $MnO_2$ suspended without pulling in appreciable amount of air | 1,460 | 480 | 250 | 150 |
| Rapid stirring pulling in an appreciable amount of air | 1,460 | 100 | 0 | 0 |

EXAMPLE VIII

Effect of temperature

Whey treated at various temperatures by stirring without positive aeration in the presence of 0.1% $MnO_2$ at pH 4.6.

| Treating Temperature | Rate of Stirring | $SO_2$ concentration in whey at start, p.p.m. | $SO_2$ concentration (p.p m) in whey after stirring | | | |
|---|---|---|---|---|---|---|
| | | | 10 min. | 30 min. | 40 min. | 50 min. |
| 25° C | Sufficient to keep $MnO_2$ suspended without pulling in appreciable quantity of air. | 1,510 | 1,220 | | | 1,000 |
| 60° C | do | 1,430 | 1,050 | 995 | | 770 |
| 25° C | Rapid stirring pulling in appreciable amount of air. | 1,510 | 399 | | | 8 |
| 60° C | do | 1,430 | 608 | 6 | 0 | 0 |

EXAMPLE IX

Whey was treated at pH 11.2 with stirring and aeration at rate of one volume of air per minute per unit volume of whey in the presence of 0.1% $MnO_2$. NaOH was used to adjust the pH to 11.2.

| Time of Sampling | $SO_2$ Concentration in Sample, p.p.m. |
|---|---|
| Original | 1,370 |
| 0 | [1] 1,200 |
| 5 | 1,140 |
| 10 | 1,260 |
| 15 | 1,260 |

[1] Sample taken as soon as possible after addition of $MnO_2$ and alkali to agitated and aerated whey.

EXAMPLE X

All work was carried out using one liter of soya whey, sufficient stirring to keep the catalyst in suspension, and an aeration rate of 1 liter of air per minute at the natural pH of the whey (4.5).

| Catalyst | Amount of Sulfur Dioxide in Whey at the Start (p.p.m.) | Catalyst concentration used, percent | Percent Sulfur Dioxide Removed in Time Shown (Minutes) | | | | | | | |
|---|---|---|---|---|---|---|---|---|---|---|
| | | | 5 | 10 | 15 | 20 | 30 | 45 | 60 | 105 |
| Manganese Dioxide | 1,550 | 0.1 | 30 | | 73 | 100 | | | | |
| Do | 2,170 | 0.1 | | | | 100 | | | | |
| Psilomelane | 2,170 | 0.1 | 13 | | 29 | | 93 | 100 | | |
| Pyrochroite [1] | 2,170 | 0.1 | 24 | | 48 | | | 76 | 86 | [1] 90 |

[1] The addition of .025 more pyrochorite at the end of sixty minutes resulted in 100% removal of sulfur dioxide in five minutes more of aeration.

The analytical method used in determining the $SO_2$ concentration of the several $SO_2$-containing liquors treated in the above examples was as follows:

A sample (about 20 to 25 cc.) of the whey, after acidification with hydrochloric acid, was mixed with an excess of standard iodine-potassium iodide solution. The excess iodine was titrated with a standard sodium thiosulfate solution in the known manner. $SO_2$ content of the whey is then calculated in a known manner from the results of the thiosulfate titration.

In undertaking to apply the invention to the treatment of waste sulfite liquors (which had been obtained from commercial paper manufacturers) it became evident at the outset that the $SO_2$ content of such liquors was relatively firmly bound, and that special methods of analysis would be required to provide an accurate analysis for total $SO_2$ content. It was found that the most satisfactory method presently known involves diluting the sample initially with 4 volumes of water, then adding 1 volume of 50% sodium hydroxide and allowing the whole to stand for 5 minutes, then acidifying with ½ volume of concentrated sulfuric acid while keeping the agitated contents cool by immersion of the flask in cold water. Thereafter the standard iodometric titration described above was carried out. The waste sulfite liquor is brown in color, but upon alkaline treatment as described above, the deep color is dispelled and the solution, upon reacidification, is light yellow permitting a more accurate end-point determination. As aeration of the sulfite liquor in the presence of $MnO_2$ proceeds, the color of the respective analytical samples deepens, so that with prolonged treatment it becomes increasingly difficult to secure a satisfactory end-point for the iodine titration. In fact, when about 95% of the $SO_2$ has been eliminated, the color of the liquor is so dark as to make analysis of the liquor exceedingly difficult. However, by using the foregoing analytical procedure, we have found that up to the point where at least 95% of the total $SO_2$ content of the waste sulfite liquor has been removed, accurate results are obtainable. Thereafter, because of the deep color of the treated sample, the results obtained become less dependable due to the difficulty in determining the end-point exactly. Until such time as more accurate analyses of the dark colored treated liquors can be secured, extrapolation of the $SO_2$ elimination curve can be practiced to give an approximation of the effectiveness of the invention. The following examples illustrate that the invention is highly useful in treating waste sulfite liquor.

EXAMPLE XI

Various samples of a waste sulfite liquor having a solids contents of about 8% and a pH of 2.5 were aerated at 90° C., a first sample being treated in the absence of manganese dioxide, and the others being treated in the presence of the indicated amounts of manganese dioxide as catalyst.

PART A

The sulfite liquor was treated at 90° C. by stirring and by aeration at a rate of one volume of air per minute per unit volume of liquor, no catalyst being present.

| Time of Sampling in Minutes | Free $SO_2$[1] in p.p.m. | Total $SO_2$[2] in p.p.m. |
|---|---|---|
| Original | 1,730 | 4,250 |
| 0 [3] | 1,310 | |
| 5 | 1,020 | |
| 10 | 785 | |
| 15 | 741 | |
| 20 | 700 | |
| 30 | 670 | 3,100 |

[1] Determined by acidifying unit volume of liquor to 50% sulfuric acid, then diluting with 20 volumes of water, and titrating with .05 N iodine.
[2] Determined by making alkaline, followed by acidification, all as described above, then titrating with .05 N iodine.
[3] Sample taken when treating temperature had been reached.

PART B

The sulfite liquor was treated as in Part A, but in the presence of 0.5% $MnO_2$.

| Time of Sampling in Minutes | Free $SO_2$[1] in p.p.m. | Total $SO_2$[2] in p.p.m. |
|---|---|---|
| Original | 1,730 | 4,250 |
| 0 | 585 | |
| 5 | 330 | |
| 10 | 270 | |
| 15 | 250 | |
| 20 | 190 | |
| 30 | 154 | 1,680 |

[1] Same as in Part A.
[2] Same as in Part A.

During the treatment a definite odor of vanillin was noticed.

PART C

Treatment as in Part A, but with amounts of catalyst as indicated below.

| Time of Sampling in Minutes | Total $SO_2$[2] in p.p.m. | |
|---|---|---|
| | .5% $MnO_2$ | 1.0% $MnO_2$ |
| Original | 4,330 | 3,650 |
| 0 | 3,540 | 2,250 |
| 5 | 1,970 | 1,850 |
| 15 | 1,800 | 1,200 |
| 30 | 1,460 | 1,320 |
| 60 | 1,280 | 895 |
| 90 | | 740 |
| 120 | 1,170 | |

[2] Same as in Part A.

PART D

A sulfite liquor was treated as in Part A, but in the presence of a first addition of .5% $MnO_2$, and subsequently in the presence of a further addition of 0.5% $MnO_2$.

| Time of Sampling in Minutes | Total $SO_2$[2] in p.p.m. |
|---|---|
| 0 | 5,450 |
| 5 | 4,190 |
| 15 | 2,650 |
| 30 | 1,820 |
| 75 | 1,510 |
| 150 | 1,310 |
| 200 | 690 |
| 210 (.5% more $MnO_2$ added) | |
| 400 | 570 |

[2] Same as in Part A.

In practicing the invention in connection with waste sulfite liquors, the aeration in the presence of the catalyst can be effected by using steam along with air, the liquor being at the temperature of the steam.

It will be understood that complete removal of sulfur dioxide from various liquors may not be essential where the treated liquor is intended to be used for nutrient media, since many microorganisms can tolerate a limited amount of sulfur dioxide. This is particularly true where waste sulfite liquor is being treated for use subsequently in growing torula yeast; there only the free $SO_2$ needs to be substantially eliminated from the liquor. Accordingly, a treatment in accordance with our invention can be terminated short of complete removal of sulfur dioxide at a sulfur dioxide content consistent with the tolerance of the particular microorganisms which are intended to be grown thereon.

From the foregoing description of our invention, it will be apparent that many variations of its principles can be practiced, and a person skilled in the art can employ such variations as best suit his particular needs.

Having now described our invention, what we claim is:

1. The process of treating an aqueous waste liquor containing sulfur dioxide, to reduce the sulfur dioxide content thereof, said process comprising: introducing and maintaining dispersed therein a small effective amount of at least one finely-divided solid oxidic manganese compound selected from the group consisting of the oxides, hydroxides and carbonate of bi- to tetravalent manganese, and ore providing at least one of said compounds in a small effective amount, thereafter continuously passing gaseous oxygen into said liquor at a pH below about 7 while maintaining the liquor at temperatures between about room temperature and its boiling point, and continuing said treatment until the total sulfur dioxide content of the liquor has been reduced to a value lower than would result from similar treatments of the liquor in the absence of said compound, or in the absence of said oxygen gassing.

2. The process as claimed in claim 1 wherein air is passed into said liquor in an amount corresponding to between ½ and 2 volumes of air per minute per unit volume of liquor being treated, thereby providing gaseous oxygen and assisting to keep said manganese compound dispersed.

3. The process as claimed in claim 1 wherein the liquor is a whey obtained from the isolation of vegetable protein.

4. The process as claimed in claim 3 wherein the whey is brought to a pH below the isoelectric point of the protein before subjecting it to said process.

5. The process as claimed in claim 3 wherein the whey is brought to a pH of about 2 before subjecting it to said process.

6. The process as claimed in claim 1 wherein the liquor is a waste sulfite liquor, and wherein said liquor is treated at temperatures near its boiling point.

7. The process for removing sulfur dioxide from a whey which has resulted from the precipitation and isolation of acid-precipitable vegetable protein by the use of sulfur dioxide as acidifying agent, said process comprising treating said whey at a pH below about 7 in the presence of from about 0.1% to about 1% of at least one finely-divided dispersed oxidic manganese compound selected from the group consisting of the oxides, hydroxides and carbonate of bi- to tetravalent manganese, and ore providing at least one of said catalysts in the stated amount, at temperatures between about room temperature and the boiling point of said whey while introducing an oxygen-containing gas into said whey at a rate of between about ½ and 2 volumes per minute per unit volume of whey being treated, and continuing said treatment until the so-treated whey after being freed of undissolved manganese compound will support the growth of microorganisms and has a lower total sulfur dioxide content than would result from like treatments of the whey in the absence of said manganese compound and in the absence of said oxygen gassing.

8. The process as claimed in claim 7 wherein said whey is brought to a pH below the isoelectric point of said protein before commencing said treatment.

9. The process as claimed in claim 8 wherein said oxygen-containing gas is introduced at a rate of about 1 volume per minute per unit of whey being treated.

10. The process as claimed in claim 9 wherein the said gas is air.

11. The process as claimed in claim 10 wherein said whey is brought to a pH of about 2 before commencing said treatment, and wherein the manganese compound is manganese dioxide in an amount between about 0.1 and 0.5%.

12. The process as claimed in claim 7 wherein said whey is obtained from the isolation of soya protein, and wherein said treatment is continued until the treated whey is substantially free of sulfur dioxide.

13. The process for beneficiating waste sulfite liquor by reducing its sulfur dioxide content, said process comprising: treating said waste liquor at a pH below about 7 in the presence of about .5% to 2% of at least one finely-divided oxidic manganese compound selected from the group consisting of the oxides, hydroxides and carbonate of bi- to tetravalent manganese, and ore providing at least one of said catalysts in the stated amount, at elevated temperatures close to and including the boiling point of said liquor, while blowing an oxygen-containing gas into said heated liquor at a rate between about ½ and 2 volumes of gas per minute per unit volume of waste liquor being treated, and continuing said treatment until a substantial reduction in the $SO_2$ content of the original liquor has been obtained and at least until the treated liquor has a lower total sulfur dioxide content than would result from like treatments of the waste liquor in the absence of said manganese compound and in the absence of said oxygen gassing.

14. The process as claimed in claim 13 wherein the pH of said liquor prior to treatment is about 2.5, and wherein said oxidic manganese compound is manganese dioxide in an amount between about 0.5% and 1%.

15. The process as claimed in claim 13 wherein the said gas is a mixture of steam and air.

16. The process as claimed in claim 15 wherein the treatment is continued until at least about 95% of the total $SO_2$ content of the original liquor has been eliminated.

17. The process of claim 15 wherein treatment is continued until the free $SO_2$ content of the liquor has been reduced sufficiently to permit the treated liquor to support the growth of torula yeast.

18. The process of treating an aqueous waste liquor containing sulfur dioxide to reduce the sulfur dioxide content thereof, said process comprising: introducing and maintaining dispersed therein a small effective amount of manganese dioxide, thereafter continuously passing gaseous oxygen into said liquor at a pH below about 7 while maintaining the liquor at temperatures between about room temperature and its boiling point, continuing said treatment until the total sulfur dioxide content of the liquor has been reduced to a value lower than would result from similar treatments of the liquor in the absence of said manganese dioxide, or in the absence of said oxygen gassing.

19. The process for removing sulfur dioxide from a whey which has resulted from the precipitation and isolation of acid-precipitable vegetable protein by the use of sulfur dioxide as acidifying agent, said process comprising treating said whey at a pH below about 7 in the presence of from 0.1% to about 1% of finely-divided dispersed manganese dioxide at temperatures between about room temperature and the boiling point of said whey while introducing an oxygen-containing gas into said whey at a rate of between about ½ and 2 volumes per minute per unit volume of whey being treated, and continuing said treatment until the so-treated whey after being freed of undissolved manganese dioxide will support the growth of microorganisms and has a lower sulfur dioxide content than would result from a like treatment of the whey in the absence of said manganese dioxide or the absence of said oxygen gassing.

20. The process for beneficiating waste sulfite liquor by reducing its sulfur dioxide content, said process comprising: treating said waste liquor at a pH below about 7 in the persence of about .5% to 2% of finely-divided manganese dioxide at elevated temperatures close to and including the boiling point of said liquor, while blowing an oxygen-containing gas into said heated liquor at a rate between about ½ and 2 volumes of gas per minute per unit volume of waste liquor being treated, and continuing said treatment until a substantial reduction of the $SO_2$ content of the original liquor has been obtained and at least until the treated liquor has a lower sulfur dioxide content than would result from a like treatment of the waste liquor in the absence of said manganese dioxide or in the absence of said gassing.

References Cited in the file of this patent

UNITED STATES PATENTS

| 1,050,723 | Elkstrom | Jan. 14, 1913 |
| 1,098,561 | Elkstrom | June 2, 1914 |
| 1,155,256 | Marchand | Sept. 28, 1915 |
| 1,284,740 | McKee | Nov. 12, 1918 |
| 2,005,412 | Connolly et al. | June 18, 1935 |
| 2,142,739 | Wallace | Jan. 3, 1939 |
| 2,285,876 | Tomlinson | June 9, 1942 |
| 2,429,143 | Tomlinson | Oct. 14, 1947 |
| 2,430,355 | McCarthy | Nov. 4, 1947 |

OTHER REFERENCES

Industrial and Engineering Chemistry, vol. 37, November 1, January 9, 1945, page 8.

The Chemical Elements and Their Compounds, 1951, by N. V. Sidgwick, published by Oxford University Press (London), pp. 1267 to 1273.